United States Patent [19]
Takahashi

[11] Patent Number: 5,615,263
[45] Date of Patent: Mar. 25, 1997

[54] DUAL PURPOSE SECURITY ARCHITECTURE WITH PROTECTED INTERNAL OPERATING SYSTEM

[75] Inventor: Richard J. Takahashi, Phoenix, Ariz.

[73] Assignee: VLSI Technology, Inc., San Jose, Calif.

[21] Appl. No.: 369,601

[22] Filed: Jan. 6, 1995

[51] Int. Cl.$^6$ ...................................................... H04L 9/00
[52] U.S. Cl. ...................................................... 380/4; 380/49
[58] Field of Search ........................................... 380/4, 49

[56] References Cited

U.S. PATENT DOCUMENTS

| | | | |
|---|---|---|---|
| 4,493,028 | 1/1985 | Heath | 380/4 |
| 5,014,191 | 5/1991 | Padgaonkar et al. | |
| 5,400,334 | 3/1995 | Hayssen | 380/9 |

FOREIGN PATENT DOCUMENTS

| | | |
|---|---|---|
| 0175487 | 3/1986 | European Pat. Off. |
| 468535 | 1/1992 | European Pat. Off. |

OTHER PUBLICATIONS

Ipower Data Security Cards, National Semiconductor Corp. (ipower Business Unit), 1090 Kifer Road (MS 16225) Sunnyvale, CA 94086 (408) 721-8797, Lit. No. 200025-002, 1994.

*Primary Examiner*—Salvatore Cangialosi
*Attorney, Agent, or Firm*—Douglas L. Weller

[57] ABSTRACT

A secure mode within a dual mode processor is implemented. In a general/external mode, the dual mode processor executes instructions provided from an external source. The instructions are supplied to the processor via input/output to the processor. Upon receiving a special software or hardware interrupt, the dual mode processor enters a secure/internal mode. The interrupt specifies a secure function stored in a read-only memory within the dual mode processor. Upon receiving such an interrupt, input/output to the dual mode processor is disabled. The identified secure function is executed by the processor. During execution of the secure function, any attempt to insert instructions not originating from the read-only memory are ignored. However, the processor may access data specifically identified by secure function being executed. Upon completion of performance of the secure function, an exit routine is executed to enable input/output to the processor and resume execution of instructions provided via input/output from the source external to the processor.

15 Claims, 5 Drawing Sheets

DUAL PURPOSE SECURITY ARCHITECTURE WITH PROTECTED INTERNAL OPERATING SYSTEM

BACKGROUND

The present invention concerns chip architecture and particularly a dual purpose secure chip architecture with a protected internal operating system.

For some processing applications, it is essential to operate in a secure environment so that operations cannot be probed or altered. In the prior art, various methods have been used to pro,de for a secure processing environment.

For example, a mechanical chassis can be used to house processing equipment. This mechanical chassis can include tamper switches and other elements to detect and protect against tampering and alterations. Unfortunately, such a mechanical chassis can add a significant amount of expense to a product.

Alternately, in order to restrict access to particular integrated circuits, the integrated circuits can be covered with epoxy or other chemical materials to hinder access. Unfortunately, often this can be easily defeated and so provides only a nominal amount of protection.

Another method to pro,de for a secure processing environment is to implement the system on a single integrated circuit. However, if a secure operating system is not implemented, these systems also, generally, can be defeated. However, implementation of a completely secure operating system for all functions significantly limits the functionality of the system.

SUMMARY OF THE INVENTION

In accordance with the preferred embodiment of the present invention, a secure mode within a dual mode processor is implemented. In a general/external mode, the dual mode processor executes instructions provided from an external source. The instructions are supplied to the processor via input/output to the processor. Upon receiving a special software or hardware interrupt, the dual mode processor enters a secure/internal mode. The interrupt specifies a secure function stored in a read-only memory within the dual mode processor. Upon receiving such an interrupt, input/output to the dual mode processor is disabled. An internal pointer identified by the interrupt is used to identify the location of the secure function stored in the read-only memory within the processor. The identified secure function is executed by the processor. During execution of the secure function, any attempt to insert instructions not originating from the read-only memory is ignored. However, the processor is allowed to access data specifically identified by secure function being executed.

Upon completion of performance of the secure function, an exit routine is executed to enable input/output to the processor and to resume execution of instructions provided via input/output from the source external to the processor. The instructions for the exit routine are also stored within the read-only memory.

In the preferred embodiment, the exit routine utilizes a special hardware control circuit to enable input/output to the processor. Also in the preferred embodiment, upon reset, the processor performs self-testing in secure mode, with input/output disabled. Upon successful completion of performance of the self test function, the exit routine is executed to enable input/output to the processor and to begin execution of instructions provided via input/output from the source external to the processor. Assurance hardware is used to provide protection against physical and electrical tampering The dual mode processing system is used, for example, to perform cryptographic functions such as encryption or public key exchange. For example, in one such application, data blocks or packets are intercepted and sent to the dual mode processor. Primitives which encrypt/decrypt the data are stored in the read-only memory within the processor. These primitives are executed when the dual mode processor is in secure mode. Other system functions are performed in general mode.

The present invention allows for an inexpensive, efficient means to provide for dual mode processing. When operating in a general mode, all external instructions may be executed without any overhead associated with a secure operating system. During operation in secure mode operation, secure functions are executed in a manner protected from alteration and probing.

DESCRIPTION OF THE PREFERRED EMBODIMENT

Figure 1:
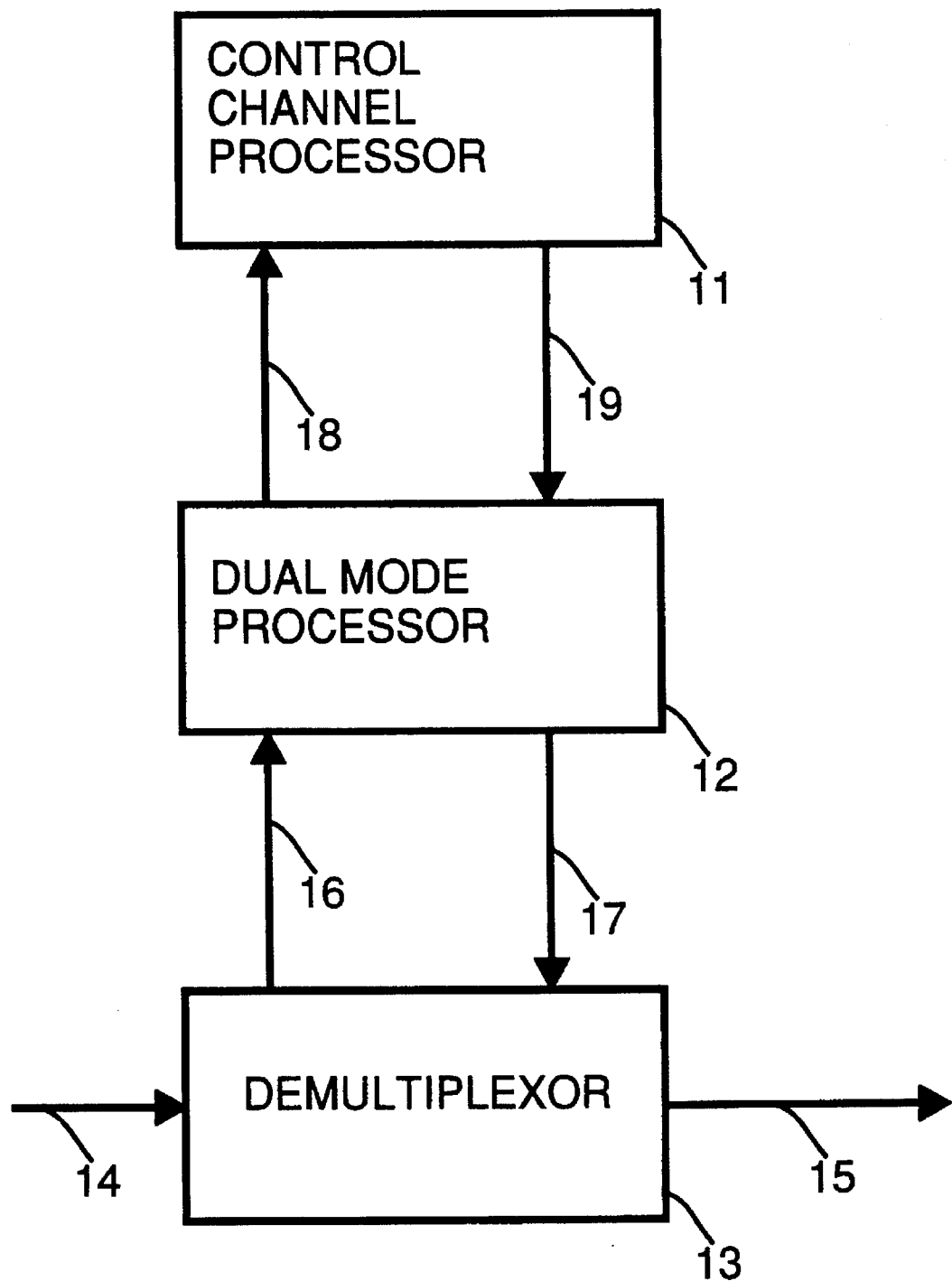
FIG. 1 shows a block diagram of a system in which a dual mode processor is used in a secure mode for encryption and decryption in accordance with a preferred embodiment of the present invention.

FIG. 1 shows a block diagram of a system in which a dual mode processor 12 is used in a secure (internal) mode for encryption and decryption in accordance with a preferred embodiment of the present invention. Dual mode processor 12 communicates with a control channel processor 11 through a data channel 18 and a data channel 19. Data channels 18 and 19, for example, are implemented as an input/output (I/O) bus which operates in accordance with a input/output bus standard, such as, for example, the Industry Standard Architecture (ISA). Control channel processor 11 provides data to dual mode processor 12. In addition, when dual mode processor 12 is in general (external) mode, control channel processor provides instructions to be executed by dual mode processor 12.

Dual mode processor 12 is used to perform a cryptographic function such as encryption or public key exchange. For example, FIG. 1 shows a demultiplexor 13 which receives an encrypted data stream 14 and produces a demultiplexed decrypted data stream 15. Encrypted data stream 14 and decrypted data streams 15 are, for example composed of data blocks or data packets being transferred to and from demultiplexor 13. Demultiplexor 13 Forwards encrypted data to dual mode processor 12 through a data path 16. Dual mode processor 12 decrypts the data and returns the decrypted data to demultiplexor 13 through a data path 17.

In order to protect the integrity of the particular cryptographic scheme utilized, it is necessary to protect the cryptographic functions within dual mode processor 12 from access or alteration. For this purpose, dual mode processor 12 includes two operating modes. In a general mode, dual mode processor 12 performs instructions received from control channel processor 11. In a secure mode, dual mode processor performs cryptographic functions in a secure environment, as discussed more fully below.

Figure 2:
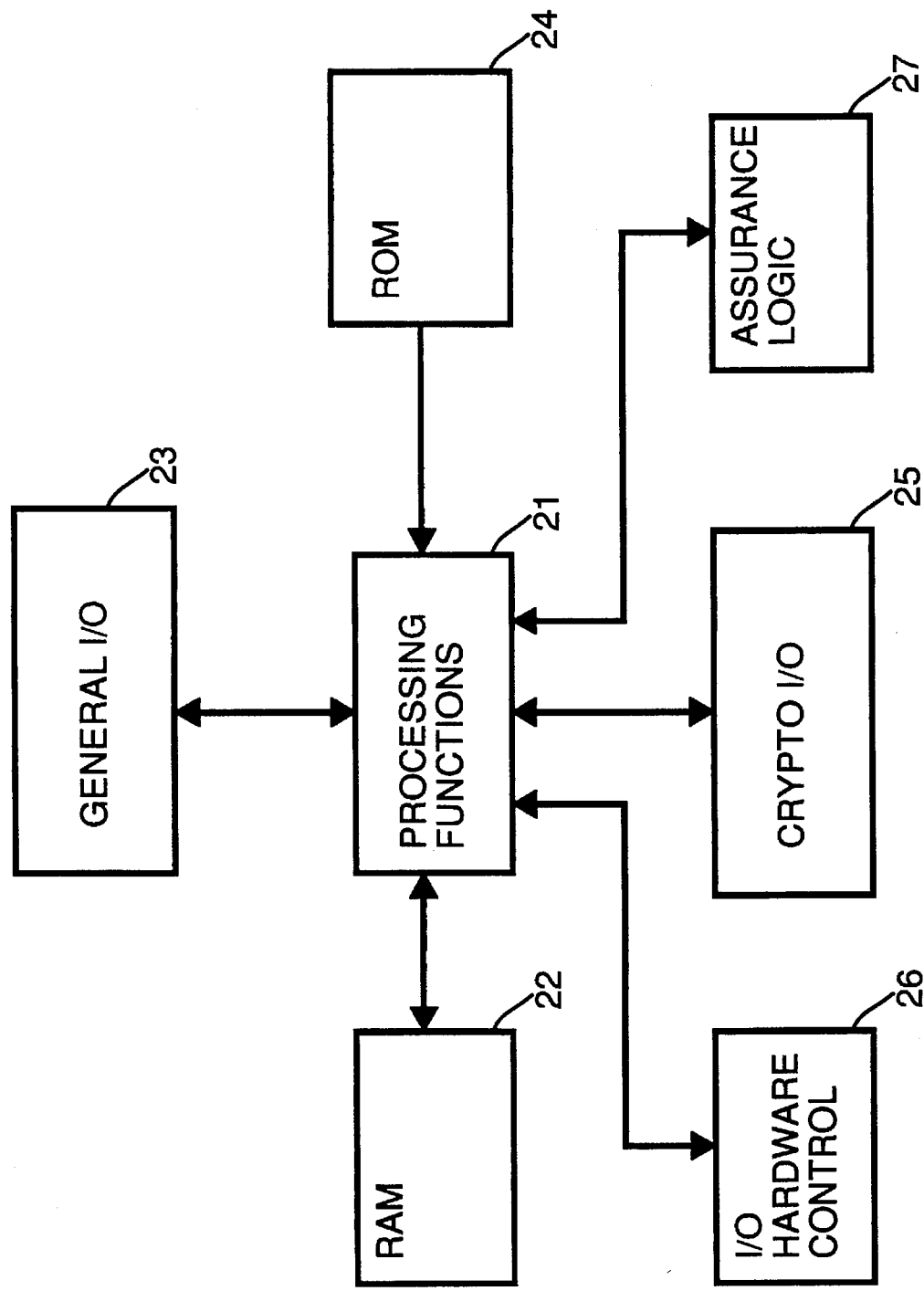
FIG. 2 shows a simplified block diagram of the dual mode processor shown in FIG. 1 in accordance with a preferred embodiment of the present invention.

FIG. 2 shows a simplified block diagram of dual mode processor 12 in accordance with a preferred embodiment of the present invention. Processing functions are performed by processing functions circuitry 21. For example, processing functions circuitry 21 is a reduced instruction set computer (RISC) processor. Processing functions circuitry 21 interfaces with data channels 18 and 19 through bus input/output (I/O) interface circuitry 23. Processing functions circuitry 21 interfaces with data paths 16 and 17 through crypto input/output (I/O) interface circuitry 25.

A random access memory (RAM) 22 is utilized by processing functions circuitry 21, for example, for data storage and for high speed execution of small blocks of code. A read-only memory (ROM) 24 is used to contain secure primitives which are executed by processing functions circuitry 21 when dual mode processor 12 is in secure mode. An I/O hardware control circuit 26 is addressed by a secure mode exit routine in order to release I/O controls when dual mode processor 12 is transitioning from secure mode to general mode. Hardware control circuit 26 contains exit logic which insures that dual mode processor 12 will execute a set sequence of commands that might not otherwise execute if dual mode processor 12 lost its step. The use of hardware control circuit 26 to transition between secure mode and general mode insures that if dual mode processor 12 loses step, for example due to a power glitch or tampering, the dual mode processor 12 will not prematurely or incompletely exit the secure mode. When a tampering or a glitch affects operation of dual mode processor 12 during the secure mode, hardware control circuit 26 will lock up dual mode processor 12 and require a reset before operation of dual mode processor 12 resumes.

Upon entry of the secure mode, hardware control circuit 26 disables input/output to dual mode processor 12. Upon exit of secure mode, hardware control circuit 26 enables input/output to dual mode processor 12.

In secure mode, all external access to processing functions 21 is disabled. While in secure mode, processing functions 21 executes only the secure primitives in ROM 24. In secure mode, processing functions 21 still has the ability to access external memory for data, but only as allowed by the secure primitives within ROM 24. Further, in the secure mode, dual mode processor 12 ignores all attempts to insert an illegal instruction.

Assurance logic 27 provides protection against physical and electrical tampering. Assurance logic is activated upon entering the secure mode.

Figure 3:
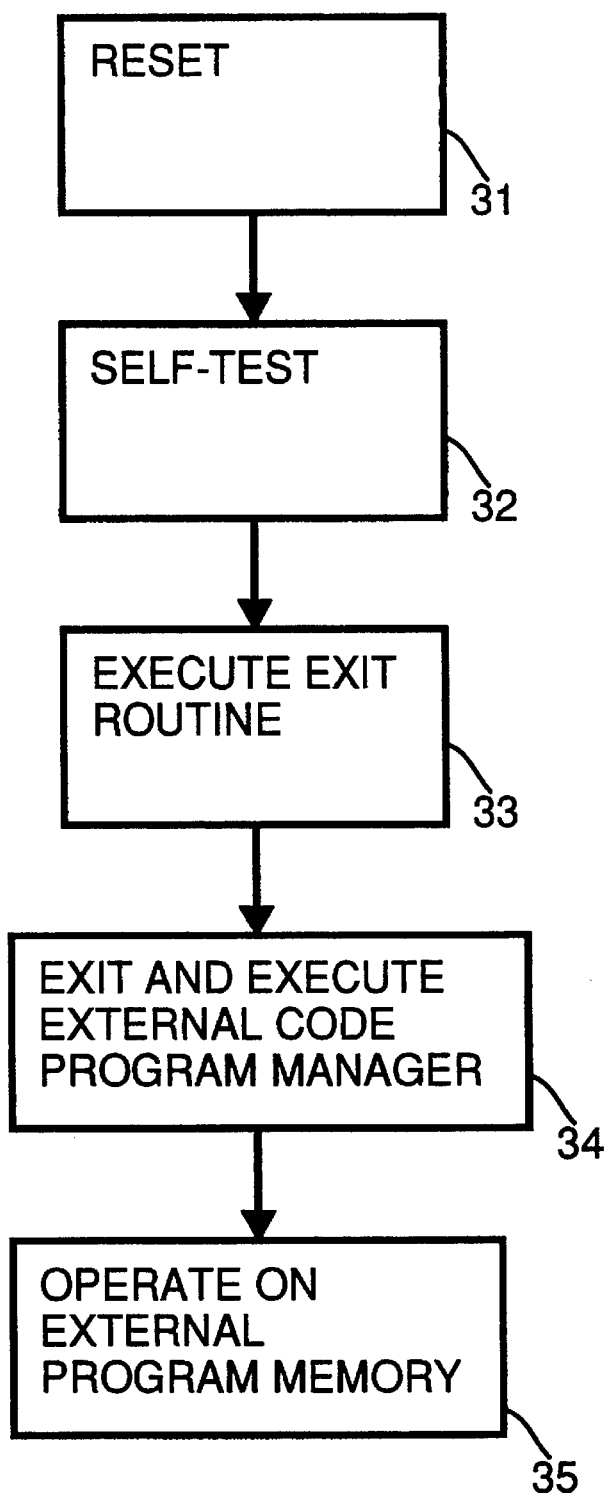
FIG. 3 shows a flowchart which illustrates initialization of the dual mode processor shown in FIG. 2 in accordance with a preferred embodiment of the present invention.

FIG. 3 shows a flowchart which illustrates initialization of dual mode processor 12. In a step 31, the system is reset. Upon reset, all input/output paths of dual mode processor 12 are disabled. In a step 32, dual mode processor 12 performs a self-test function to assure proper operation. The self-test routine executed is stored by ROM 24 as a secure routine. During execution of the self-test routine, assurance logic 27 is activated to prevent physical and electrical tampering with dual mode processor 12. If dual mode processor 12 passes the self-test function, in a step 33, the secure mode exit routine is executed. The secure mode exit routine cleans up or clears all registers. The secure mode exit routine then addresses hardware control circuit 26 in order to release I/O controls. In a step 34, the exit routine is exited and the program manager is called. In a step 35, the program manager manages execution of external programming code executed by dual mode processor 12 when dual mode processor 12 is in general mode.

Figure 4:
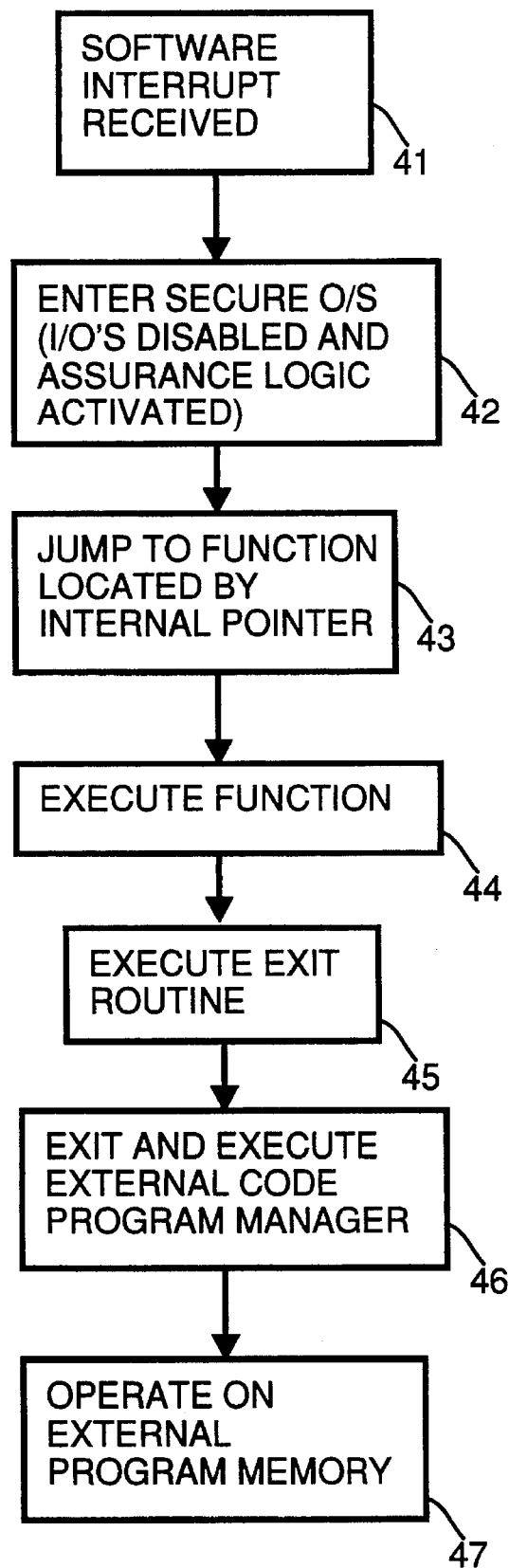
FIG. 4 shows a flowchart which illustrates operation of the dual mode processor in the secure operating mode in accordance with the preferred embodiment of the present invention.

FIG. 4 shows a flowchart which illustrates operation of the dual mode processor in the secure operating mode in accordance with the preferred embodiment of the present invention. Before step 41, dual mode processor is in the general mode and the program manager manages execution of external programming code executed by dual mode processor 12. In a step 41, a special software or hardware interrupt (SWI) is asserted. The special software/hardware interrupt directs dual mode processor 12 in order to cause dual mode processor 12 to enter the internal secure operating system. The special software/hardware interrupt includes an address which indicates a function stored within ROM 24 to be executed.

In a step 42, the secure operating system is entered. All input/output is disabled by I/O hardware control circuit 26. Assurance logic 27 is activated to protect dual mode processor 12 from physical or electrical tampering. In a step 43, the address function within ROM 24 specified by the address within the special software/hardware interrupt is located by an internal pointer. In a step 44, the addressed function is executed. In a step 45, the secure mode exit routine is executed. The secure mode exit routine cleans up or clears all registers. The secure mode exit routine then instructs hardware control circuit 26 to release I/O controls. In a step 46, the exit routine is exited and the program manager is called. In a step 47, the program manager manages execution of external programming code executed by dual mode processor 12 when dual mode processor 12 is in general mode.

Figure 5:
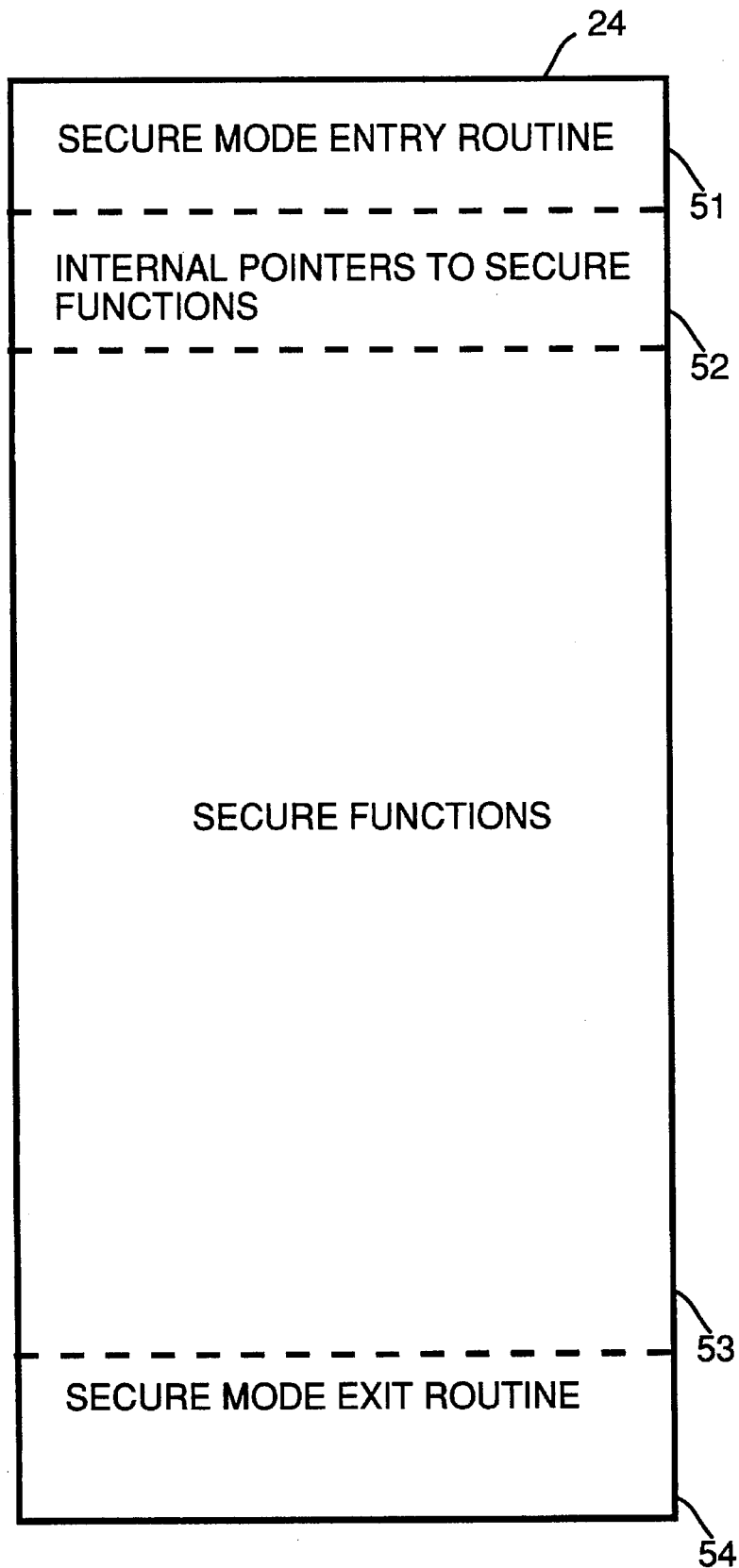
FIG. 5 is a block diagram which indicates contents of a ROM within the dual mode processor shown in FIG. 2 in accordance with the preferred embodiment of the present invention.

FIG. 5 shows an example of contents within ROM 24. ROM 24 contains a secure mode entry routine 51. Secure mode entry routine 51 is the first routine executed when secure mode is entered or when dual mode processor 12 is reset. Secure mode entry routine 51 disables all I/O to dual mode processor 12 and uses internal pointers 52 to jump to secure functions 53. Each secure function in secure functions 53 is made up of one or more secure primitives. The particular secure functions stored within ROM 24 vary with the particular application to be implemented. For example, in the preferred embodiment, secure functions 53 include primitives used for cryptographic operations. After a secure function has been executed, the secure mode is exited using secure mode exit routine 54.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A computer implemented method for providing a secure mode within a processor, the method comprising the following steps:
   (a) executing instructions provided by a source external to the processor, the instructions being supplied to the processor via input/output to the processor; and,
   (b) upon receiving an interrupt specifying a secure function, performing the following substeps:
   (b.1) disabling input/output to the processor,
   (b.2) performing the secure function specified by the interrupt, instructions for the secure function being stored in a read-only memory within the processor, and
   (b.3) upon completion of performing the secure function, executing an exit routine which enables input/output to the processor and allows resumption of execution of instructions provided by the source external to the processor, instructions for the exit routine being stored within the read-only memory.

2. A computer implemented method as in claim 1 wherein in substep (b.3), enabling input/output to the processor is performed by a hardware control circuit.

3. A computer implemented method as in claim 1 additionally comprising the following steps:
   (c) upon the processor receiving a reset, performing the following step:
   (c.1) disabling input/output to the processor,
   (c.2) performing a self-test of the processor, instructions for the self test being stored in the read-only memory within the processor, and
   (c.3) upon successful completion of performing the self test function, executing the exit routine.

4. A computer implemented method as in claim 1, wherein substep (b.2) includes using an internal pointer identified by the interrupt, the internal pointer pointing to the secure function.

5. A computer implemented method as in claim 1 wherein substep (b.2) includes performing primitives which encrypt/decrypt a data stream.

6. A dual mode processor comprising:
   instruction execution means for executing instructions;
   input/output means for providing external instructions by a source external to the dual mode processor; and,
   read-only memory storing primitives for a secure operating system, the primitives including instructions which, when executed by the instruction execution means, perform the following functions:
   disable input/output to the dual mode processor,
   perform secure functions specified by interrupts to the dual mode processor, and
   upon completion of performing any of the secure functions, execute an exit routine which enables input/output to the dual mode processor and allows resumption of execution of instructions provided by the source external to the dual mode processor.

7. A dual mode processor as in claim 6 additionally comprising specialty circuitry which, when called by the exit routine, enables input/output to the dual mode processor and which is used when entering a secure mode to disable input/output to the dual mode processor.

8. A dual mode processor as in claim 7 additionally including assurance hardware which provides physical and electrical security to the dual mode processor when the dual mode processor is in the secure mode.

9. A dual mode processor as in claim 6 wherein the read-only memory additionally stores primitives which, when executed by the instruction execution means, perform the following functions in response to the dual mode processor receiving a reset:
   disable input/output to the dual mode processor,
   perform a self-test of the dual mode processor, and
   upon successful completion of performing the self test function, execute the exit routine.

10. A dual mode processor as in claim 6, wherein the read-only memory includes internal pointers which point to secure functions, the internal pointers being indicated by interrupts to the dual mode processor.

11. A dual mode processor as in claim 6 wherein the secure functions include primitives which encrypt/decrypt a data stream.

12. A system for performing a cryptographic function on data in a data stream, the system comprising:
   interception means for intercepting the data stream; and,
   a dual mode processor including,
      instruction execution means for executing instructions;
      input/output means for providing external instructions by a source external to the dual mode processor;
      read-only memory storing primitives for a secure operating system, the primitives including instructions which, when executed by the instruction execution means, perform the following functions:
      disable input/output to the dual mode processor,
      perform secure functions specified by interrupts to the dual mode processor, the special functions including primitives which encrypt/decrypt the data in the data stream, and
      upon completion of performing any of the secure functions, execute an exit routine which enables input/output to the dual mode processor and allows resumption of execution of instructions provided by the source external to the dual mode processor.

13. A system as in claim 12, wherein the dual mode processor additionally includes specialty circuitry which, when called by the exit routine, enables input/output to the dual mode processor.

14. A system as in claim 12, wherein the read-only memory additionally stores primitives which, when executed by the instruction execution means, perform the following functions in response to the dual mode processor receiving a reset:
   disable input/output to the dual mode processor,
   perform a self-test of the dual mode processor, and
   upon successful completion of performing the self test function, execute the exit routine.

15. A system as in claim 12, wherein the read-only memory includes internal pointers which point to secure functions, the internal pointers being indicated by interrupts to the dual mode processor.

* * * * *